United States Patent [19]

Hartley

[11] 4,230,026

[45] Oct. 28, 1980

[54] RECIPROCATING PISTON DEVICE

[76] Inventor: E. Dale Hartley, 2700 Jalmia Dr., Los Angeles, Calif. 90046

[21] Appl. No.: 954,403

[22] Filed: Oct. 25, 1978

[51] Int. Cl.³ .............................. F01B 9/02; F16J 1/14
[52] U.S. Cl. ...................................... 92/138; 92/128; 92/221; 74/25
[58] Field of Search ................... 92/138, 74, 128, 221, 92/255; 91/174; 74/25

[56] References Cited

U.S. PATENT DOCUMENTS

| 1,103,986 | 7/1914 | Murray et al. | 92/138 |
| 1,658,850 | 2/1928 | Mars | 92/138 |
| 1,791,672 | 2/1931 | Hinckley | 92/138 |
| 3,279,391 | 10/1966 | Masciopinto | 92/138 |
| 3,657,972 | 4/1972 | Strebel et al. | 92/138 |

FOREIGN PATENT DOCUMENTS 1027693   4/1958   Fed. Rep. of Germany ............. 92/138

Primary Examiner—Paul E. Maslousky
Attorney, Agent, or Firm—Gordon L. Peterson

[57] ABSTRACT

A reciprocating piston device, such as a pressure pump, a vacuum pump or a compressor comprising a cylinder and a piston reciprocable in the cylinder. The piston includes a piston body having a cavity therein and a pivot arm mounted on the piston body for pivotal movement in the cavity. The pivot arm has a passage therein which is within the piston body and which receives a rotatable drive member, such as an eccentric. As the eccentric is rotated, the piston is reciprocated within the cylinder with the pivotal movement of the pivot arm accommodating one component of movement of the eccentric.

8 Claims, 5 Drawing Figures

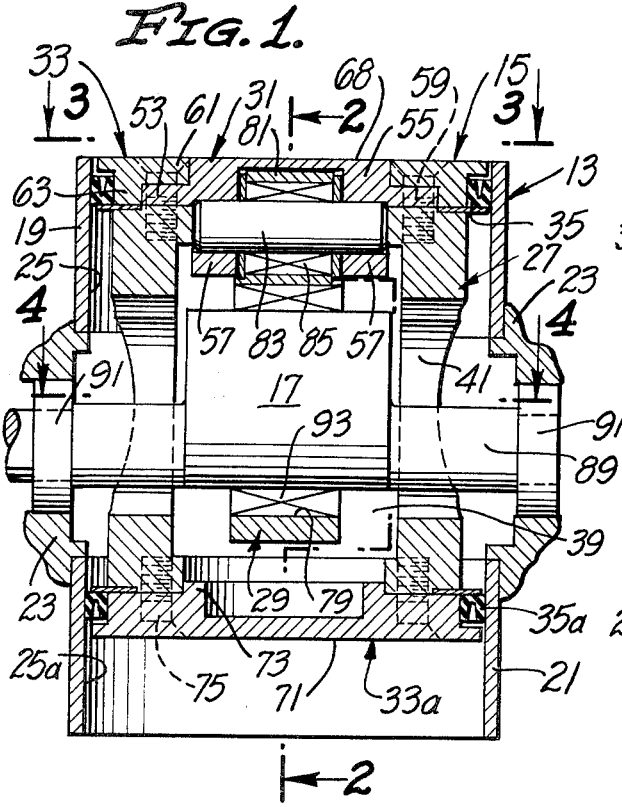
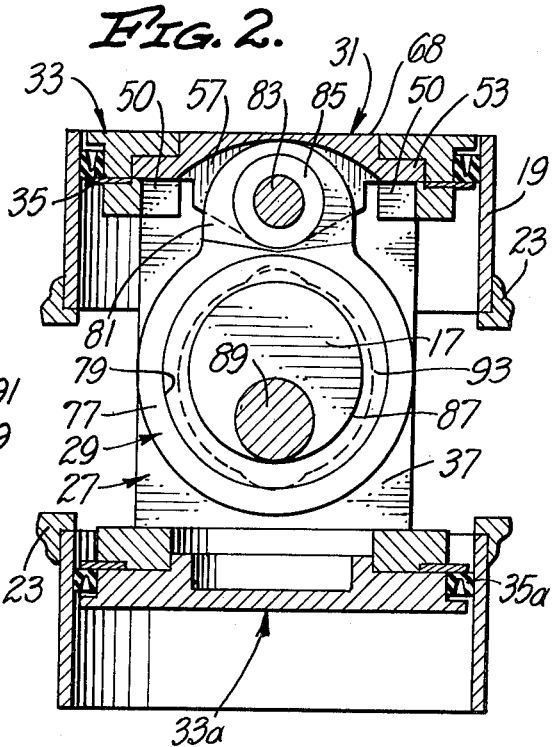
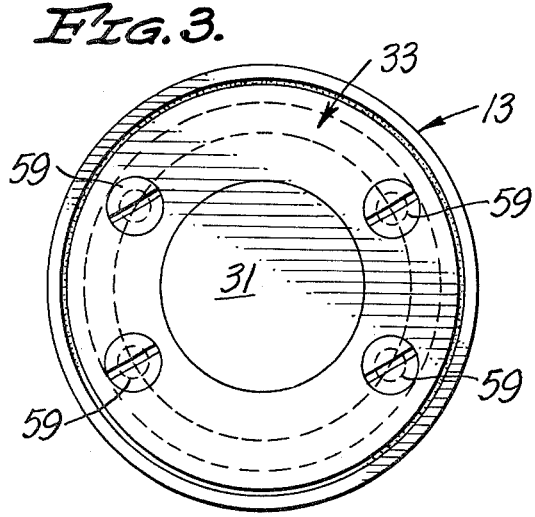
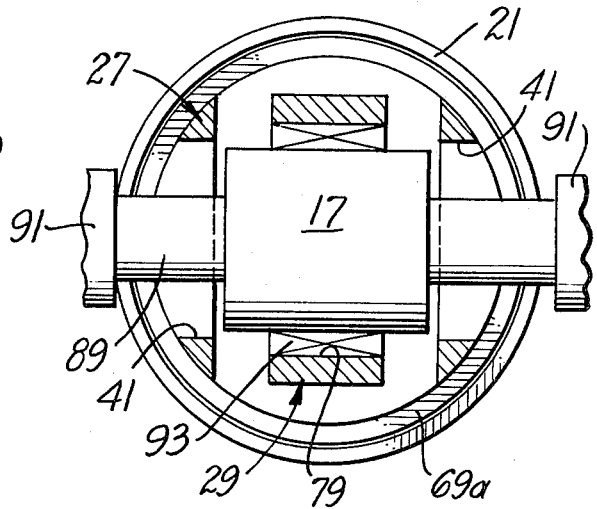

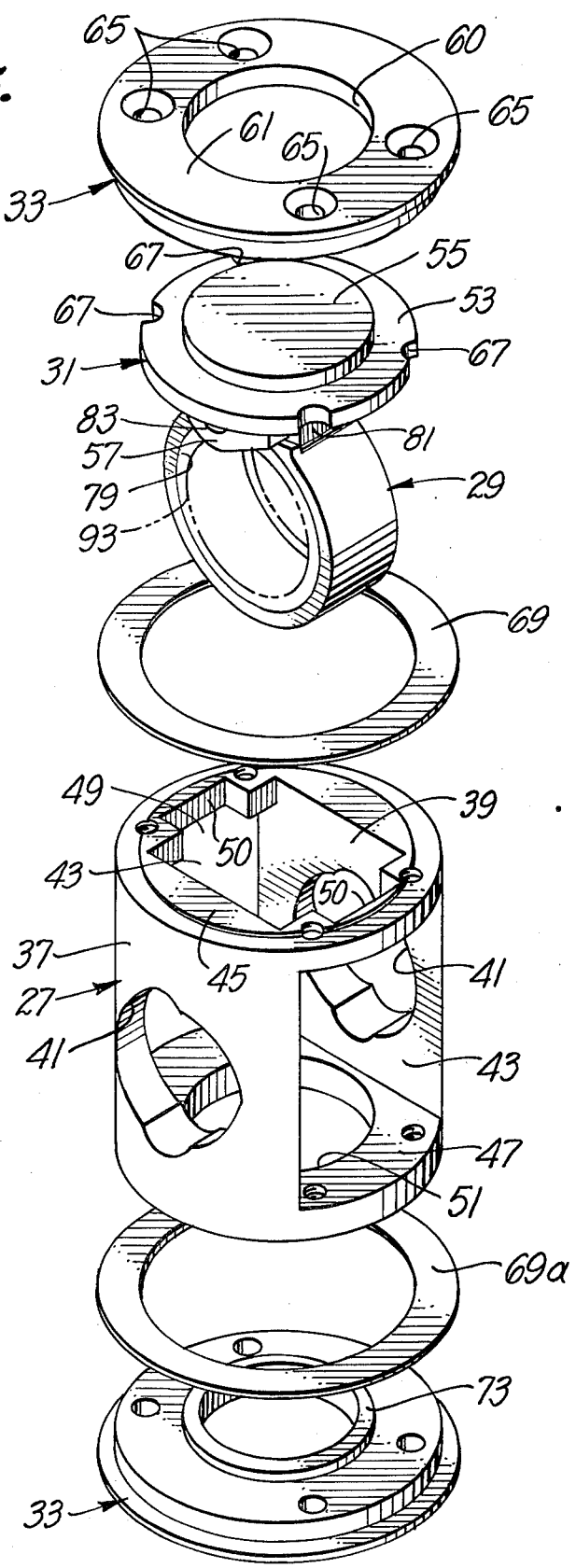

RECIPROCATING PISTON DEVICE

BACKGROUND OF THE INVENTION

This invention relates to reciprocating piston devices, such as pressure pumps, vacuum pumps and compressors.

Single-acting pistons are typically reciprocated by a crank joined to the nonworking end of the piston by a connecting rod. However, when a piston is to be double acting, the conventional method of reciprocating the piston is not feasible.

My prior U.S. Pat. No. 3,410,477 discloses a vacuum pump employing a double-acting piston which is driven by an eccentric which is received within the piston. Similarly, my U.S. Pat. No. 3,834,840 shows a similar reciprocating piston device in which a piston is driven by an eccentric received within the piston and special planar roller bearings are provided at the opposite ends of a yoke for accommodating the lateral component of motion from the eccentric.

Although both of my prior patented reciprocating piston devices function satisfactorily, the earlier patented construction requires relatively close tolerances for the drive assembly. My later patented construction overcomes this problem but some difficulty has been experienced in keeping the planar bearings properly lubricated. The loss of lubricant accelerates wear and can bring about premature failure. Because of the heat of compression, this problem is most acute for compressors.

SUMMARY OF THE INVENTION

This invention provides a novel reciprocating piston device which overcomes the disadvantages noted above. One feature of this invention is the use of a novel driving connection between the piston and the rotary input motion to the piston. In addition, the construction of this invention is relatively simple, inexpensive and easy to assemble.

A reciprocating piston device of the type with which the present invention is applicable may include a cylinder and a piston reciprocable in the cylinder. The piston includes a piston body having a cavity therein. A rotatable drive member having some "throw", such as a cam or an eccentric, is mounted within the piston cavity for rotation about a rotational axis.

To drivingly couple the rotatable drive member to the piston, the piston includes a pivot arm mounted on the piston body for pivotal movement in the cavity. The pivot arm has a passage which is within the piston body, and the rotatable drive member is received in the passage of the pivot arm. Thus, as the rotatable drive member rotates, it can reciprocate the piston along a linear path and oscillate the pivot arm about its pivot axis. The oscillation of the pivot arm accommodates the lateral component of motion of the rotatable drive member. This eliminates the need for the planar bearings of my U.S. Pat. No. 3,834,840 and close tolerances are not required.

This construction retains lubricant much better than the prior art constructions. For example, by employing the pivot arm, a conventional cylindrical roller bearing can be used in the mounting of the pivot arm for movement about a pivot axis. Cylindrical roller bearings hold lubricant much better than the planar bearings of the prior art.

A cylindrical needle bearing can be used in the passage between the rotatable drive member and the pivot arm. A needle bearing is better than a ball bearing for this function because it requires less room and it facilitates assembly of the rotatable member into the bearing.

The pivot arm can advantageously be mounted on an anchor plate which in turn is mounted on the piston body. In a preferred construction, the pivot arm is attached to the anchor plate by a pin, and a bearing is provided between the pin and the pivot arm.

Piston caps or retainers are provided at the opposite ends of the piston body. The piston caps cooperate with adjacent shoulders on the piston body to retain annular seals which extend radially outwardly of the piston body toward the cylinder wall. In addition, one of the piston caps serves as a retainer for the anchor plate.

One of the piston caps provides one of the working faces for the piston. The other of the piston caps cooperates with the anchor plate to provide the other working face for the piston.

The piston body includes a peripheral wall which at least partially circumscribes the cavity within the piston body. The peripheral wall has one or more openings to permit the rotatable drive member to extend into the cavity.

To facilitate assembly, one end of the piston body is preferably open and the anchor plate and the pivot arm are preassembled. This permits assembly of the anchor plate-pivot arm unit onto the piston body by inserting the pivot arm through the opening and using the anchor plate to close the opening.

The invention, together with further features and advantages thereof, may best be understood by reference to the following description taken in connection with the following illustrative drawing.

BRIEF DESCRIPTION OF THE DRAWING

FIG. 1 is a longitudinal sectional view through a reciprocating piston device constructed in accordance with the teachings of this invention.

FIG. 2 is a sectional view taken generally along line 2—2 of FIG. 1.

FIG. 3 is a top plan view taken generally along line 3—3 of FIG. 1.

FIG. 4 is a sectional view taken generally along line 4—4 of FIG. 1.

FIG. 5 is an exploded isometric view of the piston exclusive of the pivot arm.

DESCRIPTION OF THE PREFERRED EMBODIMENT

The drawing shows a reciprocating piston device 11 which generally includes a cylinder 13, a piston 15 and a rotatable drive member in the form of an eccentric 17. The reciprocating piston device 11 may be a pressure pump, a vacuum pump or a compressor.

The cylinder 13 is of conventional construction and includes identical, coaxial, cylindrical cylinder liners 19 and 21 appropriately contained within a cylinder wall 23 in a well-known manner. For example, the cylinder 13 may be of the type shown in my prior U.S. Pat. No. 3,410,477, and the liners 19 and 21 may be mounted within cylinder structure in the same manner shown for the cylinder liners 61 and 63 of the patented construction. The cylindrical liners 19 and 21 define inner cylindrical surface sections 25 and 25a, respectively, and the cylinder 13 defines pumping chambers at the opposite ends of the piston 15.

The piston 15 includes a piston body 27, a pivot arm 29, an anchor plate 31, piston caps or retainers 33 and 33a, and identical annular seals 35 and 35a. The piston body 27 is constructed of a suitable metal, such as aluminum, and in the embodiment illustrated, is generally in the form of a cylindrical sleeve. The piston body 27 has a peripheral wall 37 (FIG. 5) and a large interior cavity 39. The peripheral wall 37 has identical diametrically aligned openings 41 and larger diametrically aligned openings 43.

The piston body 27 has opposite end walls 45 and 47 having openings 49 and 51, respectively, so as to effectively convert the end walls 45 and 47 into circumscribing shoulders. The opening 49 is essentially rectangular with diametrically opposed end notches 50 which enlarge the rectangle, and the opening 51 is cylindrical.

The anchor plate 31 is constructed of a rigid material which may be a metal, such as steel. The anchor plate 31 has a plate section which includes an annular flange 53 surrounding a cylindrical central core 55. The anchor plate 31 has a pair of spaced parallel mounting brackets 57 (FIG. 1).

The flange 53 rests on the end wall 45 with the mounting brackets 57 projecting through the opening 43 and into the cavity 39. The anchor plate 31 is attached to the piston body 27 by the piston cap 33 and a plurality of screws 59. The piston cap 33 is in the form of a ring having a center opening 60 and includes a circumferential flange 61 and an annular axial projection 63. The screws 59 pass through holes 65 (FIG. 5) in the flange 61 and peripheral recesses 67 in the periphery of the anchor plate 31 and into the piston body 27. The flange 61 overhangs the flange 53 as shown in FIGS. 1 and 2. The core 55 is received in the opening 60 with a close fit, i.e., the flange 61 surrounds the core 55 in close proximity thereto to tightly retain the anchor plate 31 in a fixed position relative to the piston body 27. The outer radial faces of the piston cap 33 and the core 55 are contiguous and coplanar as shown in FIGS. 1 and 2 and they cooperate to define an outer end face 68 of the piston 15. A suitable seal, such as a sealant or O-ring (not shown) is used to seal the interface between the piston cap and the anchor plate 31.

The seal 35 is seated in an annular groove. The groove is defined by a flange on the piston cap 33 and a thin annular retainer 69 clamped between the piston cap 33 and the end wall 45. The seal 35a is similarly retained by a retainer 69a.

The piston cap 33a has a planar, imperforate outer end face 71 (FIG. 1) and an annular axial protrusion 73. The piston cap 33a is attached to the end wall 47 by screws 75. The protrusion 73 is received within the opening 51 in the end wall 47, and the retainer 69a is clamped between the end wall 47 and the piston cap 33a as described above for the seal 35.

The pivot arm 29 has an enlarged section 77 (FIG. 2) which has a cylindrical passage 79 extending therethrough and a section 81 of reduced dimensions sized to fit between the mounting brackets 57. The pivot arm 29 is sized to be received through the opening 49 and the end notches 50, and the brackets 57 are sized to be received through the wide or rectangular part of the opening 49. The pivot arm 29 is mounted for pivotal movement about a pivot axis by a wrist pin 83 and a conventional cylindrical needle bearing 85 retained in an opening in the section 81 of the pivot arm. The pin 83 extends through the bearing 85 and through aligned openings in the mounted brackets 57. The pivot axis of the pivot arm 29 is parallel to the axis of the openings 41 in the peripheral wall 37 and to the outer end faces 68 and 71 of the piston. The pivot axis is adjacent the end face 68 of the piston 15. With this mounting construction, the pivot arm 29 lies entirely within the cavity 39 and does not extend axially outwardly of the piston.

Although the pivot arm 29 can be driven by different rotatable drive members, the eccentric 17 is preferred. The eccentric 17 is received within the passage 79 and has a cylindrical peripheral surface 87. The eccentric is mounted on a drive shaft 89 which in turn has its opposite ends mounted by a pair of bearings 91. The bearings 91 are shown diagrammatically in FIG. 1, but the mounting arrangement for the shaft 89 may be similar to the mounting arrangement for the drive shaft shown in my U.S. Pat. No. 3,410,477. The rotational axis of the eccentric 17 is parallel to the pivot axis of the pivot arm 29 and is radially displaced from the geometric axis of the cylindrical eccentric 17. A conventional cylindrical needle bearing 93 is suitably retained in the passage 79 and receives the eccentric 17.

In use, the eccentric 17 is rotated by a motor (not shown) or other suitable means, and this causes the eccentric to reciprocate the piston 15 in the cylinder 13 to cyclically vary the volumes of the chambers in the cylinder 13 at the opposite ends of the piston 15. The pivot arm 29 oscillates about its pivot axis during the reciprocation of the piston to enable the piston to reciprocate linearly while the eccentric rotates. The needle bearings 85 and 93 are effective lubricant traps and this minimizes the lubrication problems of the prior art. Both of the piston faces 68 and 71 provide fluid-tight surfaces for working on a fluid medium within the cylinder 13. This reciprocating motion of the double-acting piston 15 can be used, for example, in pumping or compressing a fluid.

Although an exemplary embodiment of the invention has been shown and described, many changes, modifications and substitutions may be made by one having ordinary skill in the art without necessarily departing from the spirit and scope of this invention.

I claim:

1. A reciprocating piston device comprising:
   a cylinder;
   a piston reciprocable in said cylinder;
   said piston including a piston body having a cavity therein, a pivot arm and means for mounting the pivot arm on said piston body for pivotal movement in said cavity, said pivot arm having a passage therein which is within the cavity;
   a rotatable drive member in said passage;
   means for mounting said rotatable drive member for rotation about a rotational axis in said passage, said rotatable drive member having some throw as it rotates about said rotational axis whereby the rotatable drive member can drive the pivot arm and reciprocate the piston body; and
   said pivot arm mounting means including an anchor plate mounted on said piston body, a pin extending into said anchor plate and said pivot arm, and bearing means between the pin and the pivot arm.

2. A device as defined in claim 1 wherein said pivot arm mounting means includes a roller bearing.

3. A device as defined in claim 1 wherein said piston body includes a surface for supporting the anchor plate and a retainer attached to the piston body for mounting the anchor plate on the piston body.

4. A device as defined in claim 1 wherein said piston body includes a peripheral wall at least partially circumscribing said cavity, said peripheral wall having an opening therein, said rotatable drive member extending through said opening and into said passage.

5. A reciprocating piston device comprising:
a cylinder;
a piston reciprocable in said cylinder;
said piston including a piston body having a cavity therein, a pivot arm and means for mounting the pivot arm on said piston body for pivotal movement in said cavity, said pivot arm having a passage therein which is within the cavity;
a rotatable drive member in said passage;
means for mounting said rotatable drive member for rotation about a rotational axis in said passage, said rotatable drive member having some throw as it rotates about said rotational axis whereby the rotatable drive member can drive the pivot arm and reciprocate the piston body; and
at least one end of said piston body being open and communicating with said cavity, said pivot arm mounting means including an anchor plate closing said one open end of the piston body and means for pivotally attaching the pivot arm to the anchor plate.

6. A device as defined in claim 5 including a needle bearing in said passage between the rotatable drive member and the pivot arm.

7. A device as defined in claim 5 including a piston cap circumscribing a region of the anchor plate and at least assisting in retaining said anchor plate on said piston body, said piston cap and said anchor plate cooperating to at least partially define one working face of the piston, and means for sealing the interface between the anchor plate and the piston cap.

8. A reciprocating piston device comprising:
a cylinder;
a piston reciprocable in said cylinder;
said piston including a piston body having a cavity therein, a pivot arm and means for mounting the pivot arm on said piston body for pivotal movement in said cavity, said pivot arm having a passage therein which is within the cavity;
a rotatable drive member in said passage;
means for mounting said rotatable drive member for rotation about a rotational axis in said passage, said rotatable drive member having some throw as it rotates about said rotational axis whereby the rotatable drive member can drive the pivot arm and reciprocate the piston body; and
said piston body including a peripheral wall and first and second end walls, each of said end walls having an opening therein leading to said cavity, said pivot arm mounting means including an anchor plate supported on said first end wall and closing the opening in said first end wall, a pin extending into said anchor plate and said pivot arm, roller bearing means between the pin and the pivot arm, and a first piston cap attached to the piston body for mounting the anchor plate on said first end wall, said peripheral wall having an opening therein, said rotatable drive member extending through said opening and into said passage, said rotatable drive member including an eccentric in said passage, roller bearing means in said passage between said eccentric and said pivot arm, and a second piston cap attached to said piston body adjacent said second end wall and closing the opening thereof.

* * * * *